United States Patent Office 3,479,863
Patented Nov. 25, 1969

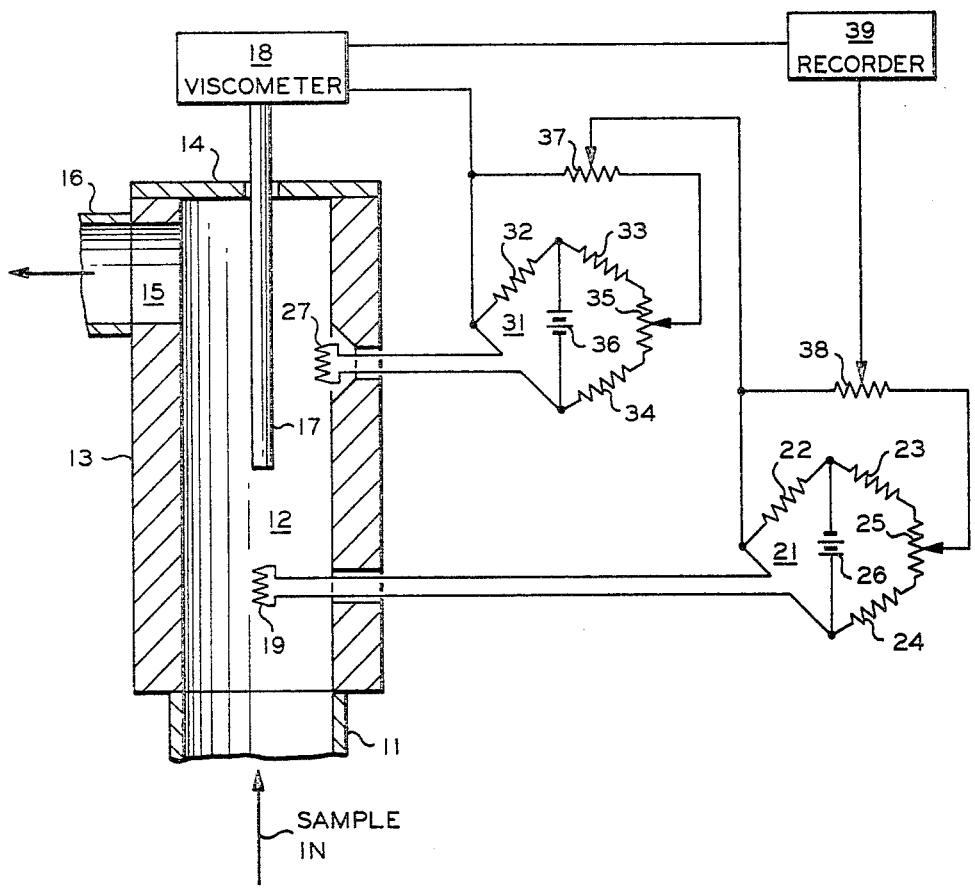

3,479,863
COMPENSATION OF VISCOMETER FOR
VARIATIONS IN TEMPERATURE PROFILE OF SAMPLE
Louis D. Kleiss, Borger, Tex., assignor to Phillips
Petroleum Company, a corporation of Delaware
Filed Feb. 29, 1968, Ser. No. 709,460
Int. Cl. G01n 11/02
U.S. Cl. 73—54                                    10 Claims

ABSTRACT OF THE DISCLOSURE

A viscometer probe is positioned in a chamber through which the fluid sample is passed. A first temperature sensor is positioned in a flow path adjacent the probe to measure the temperature of the fluid adjacent the probe. A second temperature sensor is spaced in a flow path from the probe and is preferably positioned at the wall of the chamber. Each temperature sensor is connected in its own Wheatstone bridge and the output voltages of the two bridges are connected in series opposition to each other and in series with the viscometer voltage output to correct the viscometer voltage output to a standard temperature.

---

As is well known, the viscosity of a material varies with temperature. In many cases of great commercial importance the variation with temperature is very rapid. For example, the viscosity of a standard petroleum oil may vary approximately 5 percent per degree in the vicinity of 120° F. In industrial processes, it is often necessary to know the viscosity with an accuracy of better than a few percent. This requires either close temperature control or some means for compensating the viscosity meaning for variations in temperature. Close temperature control is often impractical. As an illustration, in the case of the above-mentioned oil the temperature would need to be held within 0.2 degree to know the viscosity within 1 percent. Accordingly, it has become common for viscometers utilized for continuous process control to have temperature sensors positioned in the fluid adjacent the viscometer probe, with the sensor being connected in an electrical temperature compensation circuit which is connected in series with the output of the viscometer. However, it has now been discovered that the viscometer probe is sensitive to a temperature gradient between the fluid in contact with the probe and the fluid a short distance away from the probe in a direction perpendicular to the direction of flow of the fluid sample. This sensitivity is particularly significant for non-Newtonian fluids. While the gradient may not be significant in many systems where a turbulent sample flow rate is maintained, it is pronounced in systems where the sample flow is laminar and the rate is low to avoid excessive pressure drop in the apparatus or the disposal of large amounts of sample. The temperature gradient can occur from a change in the temperature of the sample fluid or a change in the ambient temperature of the environment surrounding the measuring equipment. In one process where the process reaction requires only 20 minutes, a period of one to two hours is required for the sample fluid adjacent the wall of the sample chamber to reach an equilibrium temperature after a step change in the temperature of the fluid being sampled or in the ambient temperature outside the sample chamber.

In accordance with the invention, these deficiencies can be overcome by positioning a second temperature sensor in the sample fluid at a point laterally spaced from the viscometer probe, and preferably adjacent the inner wall of the sample chamber. This second temperature sensor is connected in an electrical circuit with the first temperature sensor which is located adjacent to the probe or in flow line therewith.

Accordingly, it is an object of the invention to provide a new and improved viscosity measuring system. An object of the invention is to minimize the effects of changes in temperature of the fluid being sampled or in ambient temperature on the viscosity measurement.

Other objects, aspects and advantages of the invention will be apparent from a study of the specification and the drawing.

Referring now to the drawing, there is schematically illustrated a viscosity measuring system in accordance with the invention. The sample of the fluid being measured is passed through conduit 11 into the sample chamber 12. Chamber 12 is formed by a cylindrical member 13 having an end plate 14 positioned over one end thereof. The sample fluid leaves chamber 12 by way of an opening 15 in wall 13 and passes through conduit 16 to a disposal point. The probe 17 of viscometer 18 passes through end plate 14 into chamber 12 in a coaxial relationship with wall 13. Probe 17 can be the type which is vibrated or the type which is rotated or oscillated. Viscometer 18 is assumed to be of a type whose voltage output is a logarithmic function of solution viscosity. It is advantageous in this particular case to use thermistors as temperature sensing elements. If the voltage output of viscometer 18 is linearly related to solution viscosity, it may be advantageous to use temperature sensing elements whose response is linear with temperature. Thermistor 19 is positioned in chamber 12 in line with probe 17; that is, the fluid which contacts thermistor 19 will contact or come closely adjacent to probe 17 due to the laminar flow of the sample fluid. Thermistor 19 is connected in one arm of Wheatstone bridge 21. Resistors 22, 23 and 24 and potentiometer 25 form the other three arms of bridge 21, with a D.C. source 26 connected between the junction of resistors 22 and 23 and the junction of resistor 24 and thermistor 19.

Thermistor 27 is positioned in sample chamber 12 at a distance from probe 17. While thermistor 27 can be upstream or downstream of probe 17 in the flow path of sample fluid which passes between probe 17 and wall 13 at a significant distance laterally from probe 17, it is presently preferred that thermistor 27 be located between probe 17 and wall 13, and closely adjacent to or in contact with wall 13. Thermistor 27 is connected in one arm of Wheatstone bridge 31. Resistors 32, 33 and 34 and potentiometer 35 form the other three arms of bridge 31, while D.C. source 36 is connected between the junction of resistors 32 and 33 and the junction between resistor 34 and thermistor 27. One end terminal of potentiometer 37 is connected to the contactor of potentiometer 35 while the other end terminal of potentiometer 37 is connected to the junction between thermistor 27 and resistor 32 and to one output terminal of viscometer 18. The contactor of potentiometer 37 is connected to one end terminal of potentiometer 38 and to the junction of thermistor 19 and resistor 22. The second end terminal of potentiometer 38 is connected to the contactor of potentiometer 25. The contactor of potentiometer 38 is connected to one input terminal of recorder 39. The second output terminal of viscometer 18 is connected to the second input terminal of recorder 39. The voltage output of bridge 31 appears across the resistance winding of potentiometer 37. The contactor of potentiometer 37 can be adjusted to place a greater or lesser portion of this voltage output in series with the voltage output of viscometer 18. Similarly, the output voltage of bridge 21 appears across the resistance winding of potentiometer 38, and the contactor of potentiometer 38 can also be adjusted to place a desired portion of this voltage in series with the voltage output of viscometer 18. The contactors of potentiometers 25 and 35 are adjustable to zero or balance the respective bridge circuit, while the contactors of potentiometers 37 and 38 are adjustable to vary the span of the respective bridges. The input to recorder 39 can be represented as:

$$V_R = V_V + K_1 f(T_A - T_R) + K_2 f^1(T_W - T_R)$$

where:

$V_R$ = the input to recorder 39
$V_V$ = the output of viscometer 18
$f$ = function determined by temperature measurement element response and Wheatstone bridge design
$T_R$ = the temperature to which the measurement of viscosity is to be referenced
$T_A$ = the temperature of the fluid in contact with the viscometer probe 17 as measured by thermistor 19
$f^1$ = function determined by temperature measurement element response and Wheatstone bridge design
$T_W$ = the temperature of the fluid in a flow path spaced from probe 17 as measured by thermistor 27
$K_1$ and $K_2$ are constants, $K_2$ being positive for Newtonian fluids and negative for non-Newtonian fluids such as thixotropic or pseudoplastic fluids. Where the system is to be utilized for fluids having a positive $K_2$, the polarity of D.C. source 26 is reversed from that shown in the drawing.

In one embodiment of the invention utilized for the measurement of the viscosity of a stream of a solution of a butadiene-styrene rubber in a solvent, the stream having an average cross sectional velocity of approximately 3 mm./sec., viscometer 18 was a Dynatrol viscometer which produces an output voltage which is related to the logarithm of the measured viscosity. The thermistor 19 was mounted in the same flow path as the viscometer probe, and thermistor 27 was mounted at the wall of the sample chamber approximately 1 centimeter from the probe. The electrical elements had the following values:

| Resistors: | Ohms |
|---|---|
| 19 | Approx. 400 at 100 F. |
| 22 | 10K. |
| 23 | 10K. |
| 24 | 200 |
| 25 | 1800 |
| 27 | Approx. 400 at 100 F. |
| 32 | 10K. |
| 33 | 10K. |
| 34 | 200 |
| 35 | 1800 |
| 37 | 2K. |
| 38 | 2K. |

| D.C. Sources: | Volts |
|---|---|
| 26 and 36 | 10 |

While the electrical temperature measuring circuits for establishing signals representative of the difference between the measured temperature at the thermistor and a predetermined reference temperature have been described in terms of Wheatstone bridges, any other suitable circuitry can be employed.

Reasonable variations and modifications are possible within the scope of the foregoing disclosure and the drawing.

I claim:

1. A viscometer having a sample chamber through which the sample fluid is passed under laminar flow conditions, a viscometer probe extending into said chamber substantially parallel to the path of flow of said sample fluid through said chamber, a first temperature sensing means positioned to sense the temperature of the portion of said sample fluid which contacts said viscometer probe, a second temperature sensing means positioned in said sample chamber to sense the temperature of a portion of said sample fluid having a flow path spaced from said viscometer probe, circuit means responsive to said first and second temperature sensing means to establish a temperature compensation signal, and means for connecting said temperature compensation signal in series with the output signal of said viscometer.

2. Apparatus in accordance with claim 1 wherein said temperature compensation signal can be represented as:

$$K_1 f(T_A - T_R) + K_2 f^1(T_W - T_R)$$

wherein $f$ and $f^1$ are functions determined by the response of the first and second temperature sensors, respectively, and said circuit means, $T_R$ = the temperature to which the measurement of viscosity is to be referenced,
$T_A$ = the temperature of the fluid in contact with the viscometer probe as measured by said first temperature sensing means,
$T_W$ = the temperature of the fluid in a flow path spaced from said viscometer probe as measured by said second temperature sensing means, and
$K_1$ and $K_2$ are constants, $K_2$ being positive for Newtonian fluids and negative for non-Newtonian fluids.

3. Apparatus in accordance with claim 1 wherein said first and second temperature sensing means are first and second thermistors, respectively.

4. Apparatus in accordance with claim 3 wherein said circuit means comprises first and second electrical measuring circuits, said first thermistor being connected in said first electrical measuring circuit, said second thermistor being connected in said second electrical measuring circuit, the outputs of said first and second electrical circuits being connected in series with respect to each other.

5. Apparatus in accordance with claim 4 wherein said first and second electrical measuring circuits comprise first and second Wheatstone bridges, respectively, said first thermistor being connected in one arm of said first Wheatstone bridge, said second thermistor being connected in one arm of said second Wheatstone bridge.

6. Apparatus in accordance with claim 5 wherein each of said first and second electrical measuring circuits further comprises a potentiometer having the end terminals thereof connected to the output terminals of the respective Wheatstone bridge, the portion of one potentiometer between one end terminal and the contactor thereof being connected in series with the portion of the other potentiometer between one end terminal and the contactor of the latter potentiometer.

7. Apparatus in accordance with claim 6 wherein said temperature compensation signal can be represented as:

$$K_1 f(T_A - T_R) + K_2 f^1(T_W - T_R)$$

wherein $f$ and $f^1$ are functions determined by the response of the first and second temperature sensors, respectively, and said first and second Wheatstone bridges, respectively, $T_R$ = the temperature to which the measurements of viscosity is to be referenced,
$T_A$ = the temperature of the fluid in contact with the viscometer probe as measured by said first thermistor,
$T_W$ = the temperature of the fluid in the flow path spaced from said viscometer probe as measured by said second thermistor, and
$K_1$ and $K_2$ constants, $K_2$ being positive for Newtonian fluids and negative for non-Newtonian fluids.

8. A process for establishing a signal representative of the viscosity of a fluid which comprises passing said fluid in laminar flow past a viscosity probe in contact therewith, sensing the temperature of the portion of said fluid which contacts said probe, sensing the temperature of a portion of said fluid which has a flow path spaced from said probe, producing a viscosity signal responsive to a characteristic of said probe, producing responsive to the thus sensed temperatures a temperature compensation signal, and adding said temperature compensation signal and said viscosity signal.

9. A process in accordance with claim 8 wherein said temperature compensation signal is representable by $$K_1 f(T_A - T_R) + K_2 f^1(T_W - T_R)$$

wherein $T_R$ = the temperature to which the measurement of viscosity is to be referenced, $T_A$ = the sensed temperature of the fluid which contacts said probe, $T_W$ = the sensed temperature of the fluid in a flow path spaced from said probe, $f$ and $f^1$ are functions of the characteristics of the means used to sense $T_A$ and $T_W$, and $K_1$ and $K_2$ are constants, $K_2$ being positive for Newtonian fluids and negative for non-Newtonian fluids.

10. A process in accordance with claim 9 wherein said fluid comprises a solution of a butadiene-styrene rubber in a solvent therefor.

References Cited

UNITED STATES PATENTS

| | | | |
|---|---|---|---|
| 2,396,420 | 3/1946 | Hayward et al. | 73—54 XR |
| 2,708,361 | 5/1955 | Boyle et al. | 73—59 |
| 2,837,913 | 6/1958 | Rich et al. | 73—59 |

LOUIS R. PRINCE, Primary Examiner

HARRY C. POST III, Assistant Examiner